(12) United States Patent
Jin (10) Patent No.: US 10,890,222 B2
(45) Date of Patent: Jan. 12, 2021

(54) CALIPER BRAKE

(71) Applicant: MANDO CORPORATION, Pyeongtaek-si (KR)

(72) Inventor: Sung-Ho Jin, Seoul (KR)

(73) Assignee: MANDO CORPORATION, Pyeongtaek-si (KR)

( * ) Notice: Subject to any disclaimer, the term of this patent is extended or adjusted under 35 U.S.C. 154(b) by 88 days.

(21) Appl. No.: 15/816,439

(22) Filed: Nov. 17, 2017

(65) Prior Publication Data

US 2018/0149218 A1 May 31, 2018

(30) Foreign Application Priority Data

Nov. 25, 2016 (KR) .................. 10-2016-0158240

(51) Int. Cl.
*F16D 65/092* (2006.01)
*F16D 65/00* (2006.01)
*F16D 55/226* (2006.01)
*F16D 55/224* (2006.01)
*F16D 55/00* (2006.01)

(52) U.S. Cl.
CPC ....... *F16D 65/0068* (2013.01); *F16D 55/224* (2013.01); *F16D 55/226* (2013.01); *F16D 65/0087* (2013.01); *F16D 2055/0029* (2013.01)

(58) Field of Classification Search
CPC .. F16D 2127/02; F16D 65/068; F16D 65/097; F16D 65/0972; F16D 65/0975; F16D 65/0973; F16D 65/0974; F16D 65/0979; F16D 55/226; F16D 2055/0016; F16D 2055/0041; F16D 2055/0029
See application file for complete search history.

(56) References Cited

U.S. PATENT DOCUMENTS 3,913,709 A * 10/1975 Burgdorf .............. F16D 55/226
188/73.47
6,179,095 B1 * 1/2001 Weiler .................. F16D 55/226
188/72.3

FOREIGN PATENT DOCUMENTS

| DE | 102014002133 A1 | 8/2014 | |
|---|---|---|---|
| EP | 0002399 A1 * | 6/1979 | ........... F16D 55/226 |
| FR | 2874068 A1 * | 2/2006 | ......... F16D 55/2265 |
| GB | 2233411 A * | 1/1991 | ........... F16D 55/227 |
| JP | 58-39824 A | 3/1983 | |
| KR | 97-0007217 B1 | 5/1997 | |
| KR | 10-2007-0095348 A | 9/2007 | |

* cited by examiner

*Primary Examiner* — Bradley T King
*Assistant Examiner* — Stephen M Bowes
(74) *Attorney, Agent, or Firm* — Morgan, Lewis & Bockius LLP (57) ABSTRACT

Disclosed is a caliper brake. The caliper brake includes a carrier having a pair of pad plates installed therein to be movable forward and backward; a caliper housing slidably installed at the carrier, and provided with a finger bent downward and configured to pressurize each of the pair of pad plates; and an elastic member installed at the caliper housing and configured to elastically support a lower end portion of each side of the carrier, wherein the lower end portion of each side of the carrier in contact with the elastic member is formed to be inclined.

7 Claims, 6 Drawing Sheets

CALIPER BRAKE

This application claims the benefit of Korean Patent Application No. 2016-0158240, filed on Nov. 25, 2016 in the Korean Intellectual Property Office, the disclosure of which is incorporated herein by reference.

BACKGROUND

1. Field

Embodiments of the present disclosure relate to a caliper brake, and more particularly, to a caliper brake capable of smoothly returning a pad plate to its original position when braking is released.

2. Description of the Related Art

A caliper brake mounted on a vehicle is a device configured to decelerate or stop a vehicle which is traveling or maintain a stopped state of the vehicle, and the caliper brake is a device configured to generate a braking force by forcibly squeezing both sides of a circular plate type disc rotating with a wheel by pads.

The caliper brake is generally provided with a pair of pad plates to which friction pads are attached, and a carrier coupled to a vehicle body and configured to support the pair of pad plates to be slidable, the pair of pad plates being spaced apart from each other at a predetermined interval, and a caliper housing slidably coupled to the carrier and configured to squeeze the disc by the pair of pad plates.

Meanwhile, since a caliper housing is slidably coupled to a carrier in a conventional caliper brake, there is a problem in that the caliper housing and the carrier may vertically vibrate when a braking operation is performed. Accordingly, there is a need to add a specific configuration capable of elastically supporting the carrier to control the above-described vibration.

SUMMARY

Therefore, it is one embodiment of the present disclosure to provide a caliper brake including an elastic member configured to elastically pressurize a caliper housing and a carrier to come into close contact with each other, thereby preventing vertical vibration of the caliper housing and the carrier.

It is one embodiment of the present disclosure to provide a caliper brake at which an elastic member configured to prevent vibration of a caliper housing and a carrier can be easily installed, and also which is capable of preventing a drag phenomenon when braking is released.

Additional embodiments of the disclosure will be set forth in part in the description which follows and, in part, will be obvious from the description, or may be learned by practice of the disclosure.

In accordance with one embodiment of the present disclosure, a caliper brake includes a carrier having a pair of pad plates therein installed to be movable forward and backward; a caliper housing slidably installed at the carrier, and provided with a finger bent downward and configured to pressurize each of the pair of pad plates; and an elastic member installed at the caliper housing and configured to elastically support a lower end portion of each side of the carrier, wherein the lower end portion of each side of the carrier in contact with the elastic member is formed to be inclined.

The inclined surface of the lower end portion may be formed in a direction in which the caliper housing slides.

The inclined surface of the lower end portion may be formed to include a flat portion formed in a direction in which the caliper housing slides, and an inclined portion, and the inclined portion may have a curved line shape.

The inclined surface of the lower end portion may be formed to include a flat portion formed in a direction in which the caliper housing slides, and an inclined portion, and the inclined portion may have a straight line shape.

The inclined surface of the lower end portion may be formed such that a distance from a line horizontally extending from the lower end portion is gradually increased toward the finger.

BRIEF DESCRIPTION OF THE DRAWINGS

While the present disclosure will be described in detail with reference to the following drawings, since these drawings show preferred embodiments of the present disclosure, the technical spirit of the present disclosure is not to be construed as being limited to these drawings.

These and/or other embodiments of the disclosure will become apparent and more readily appreciated from the following description of the embodiments, taken in conjunction with the accompanying drawings of which.

DETAILED DESCRIPTION

Hereinafter, embodiments of the present disclosure will be described in detail with reference to the accompanying drawings. The embodiments to be described below are provided to fully convey the spirit of the present disclosure to those skilled in the art. The present disclosure is not limited to the embodiments disclosed herein, and may be implemented in other forms. In the drawings, some portions not related to the description will be omitted and not shown to clearly describe the present disclosure, and sizes of components may be somewhat exaggerated to facilitate understanding.

A caliper brake according to one embodiment of the present disclosure is provided with a pair of pad plates to which friction pads are attached, a carrier coupled to a vehicle body and configured to support the pair of pad plates to be slidable, the pair of pad plates being spaced apart from each other at a predetermined interval, a caliper housing slidably coupled to the carrier and configured to squeeze a disc by the pair of pad plates, and an elastic member coupled to the caliper housing and configured to elastically support a lower end portion of the carrier.

At this point, the elastic member serves to prevent vertical vibration of the caliper housing and the carrier by elastically pressurizing the caliper housing and the carrier to come into close contact with each other.

Specifically, when a braking operation is performed, the elastic member is moved with the caliper housing in a state of elastically supporting the carrier, and the lower end portion of the carrier supported by the elastic member is formed to have a horizontal plane.

Figure 1:
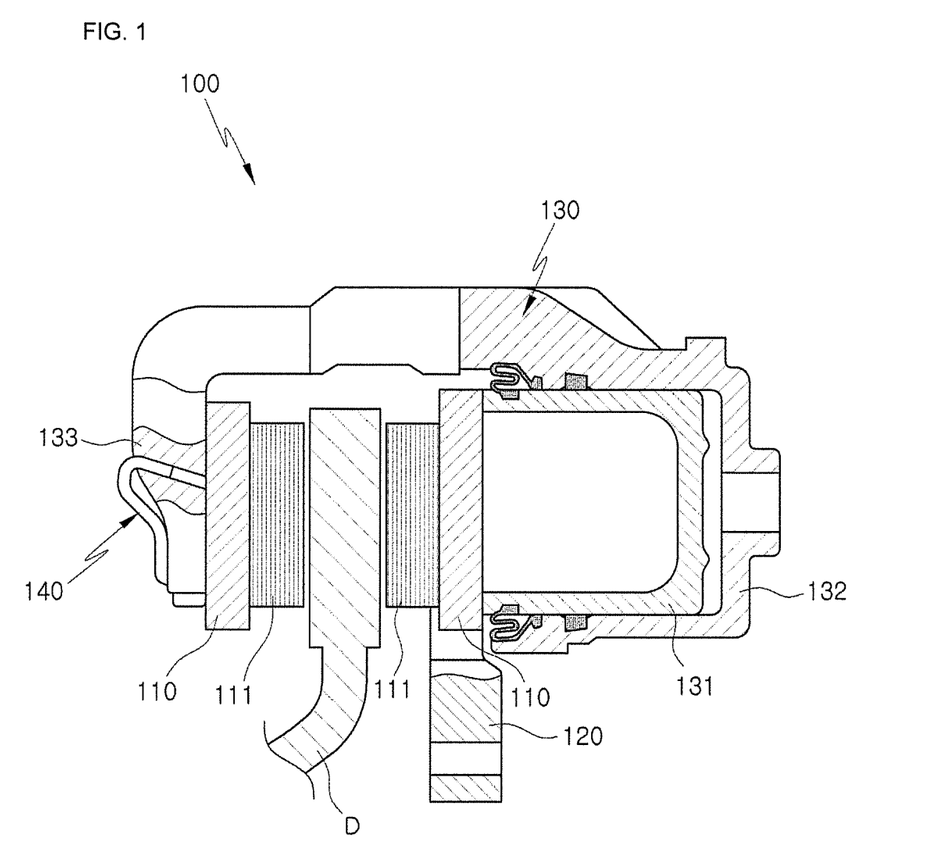
FIG. 1 is a side cross-sectional view illustrating a caliper brake according to one embodiment of the present disclosure.
Figure 2:
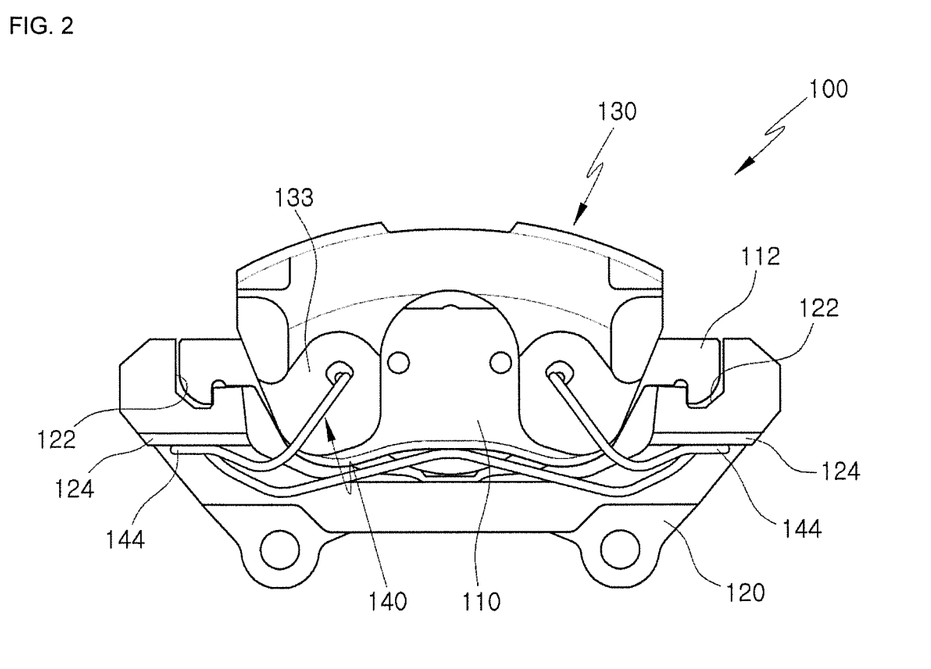
FIG. 2 is a front view illustrating the caliper brake according to one embodiment of the present disclosure.
Figure 3:
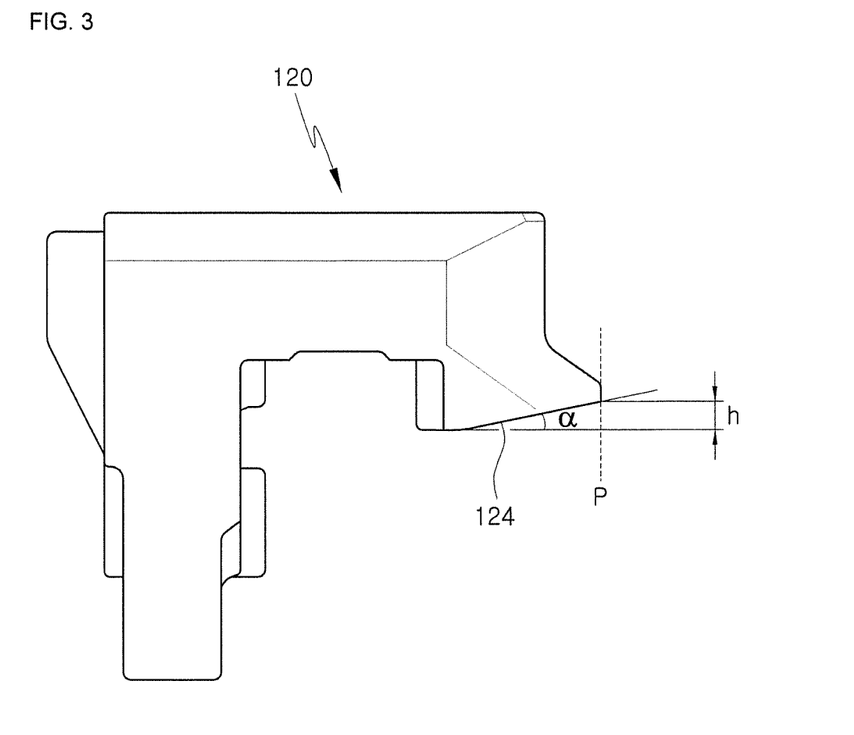
FIG. 3 is a lateral view illustrating a carrier provided in the caliper brake according to one embodiment of the present disclosure.

FIG. 1 is a side cross-sectional view illustrating a caliper brake according to one embodiment of the present disclosure, FIG. 2 is a front view illustrating the caliper brake, and FIG. 3 is a lateral view illustrating a carrier provided in the caliper brake.

Referring to FIGS. 1 to 3, a caliper brake according to one embodiment of the present disclosure is provided with a disc D rotating with a wheel (not shown), a pair of pad plates 110 configured to squeeze both sides of the disc D, a carrier 120 at which the pair of pad plates 110 are installed to be movable forward and backward, a caliper housing 130 movably installed at the carrier 120 to operate the pair of pad plates 110, and an elastic member 140 configured to prevent vertical vibration of the caliper housing 130 and the carrier 120, wherein lower end portions of both sides of the carrier 120 in contact with the elastic member 140 may be formed to be inclined.

A friction pad 111 rubbing against the disc D is attached to one side of each of the pair of pad plates 110, and a protrusion 112 is formed at end portions of both sides of each of the pair of pad plates 110. At this point, the pair of pad plates 110 are classified into an inner pad plate 110 disposed to be in contact with a piston 131, which will be described below, and an outer pad plate 110 disposed to be in contact with a finger 133 which will be described below.

The carrier 120 is coupled to a knuckle (not shown) of the vehicle body to be positioned at one side of an outer circumference of the disc D. A slide recess 122 is formed at inner both sides of the carrier 120 at a position corresponding to the protrusion 112 formed at the both sides of each of the pair of pad plates 110. At this point, the slide recess 122 is formed at a front side and a rear side of the carrier 120 to allow each of the pair of pad plates 110 to be installed. That is, the slide recesses 122 are formed at both sides of the carrier 120 and spaced apart from each other at a predetermined interval, and the carrier 120 has an opened shape to allow the disc D to be smoothly inserted and positioned at a center of the carrier 120.

The protrusion 112 is fit into and coupled to the slide recess 122 to allow the pair of pad plates 110 to slide along the slide recess 122 of the carrier 120. When each of the pair of pad plates 110 is moved forward and backward along the slide recess 122, the friction pad 111 is brought into close contact with each of both side surfaces of the disc D, thereby generating a braking force.

As a guide rod (not shown) installed at both ends of the caliper housing 130 is inserted into a guide hole (not shown) formed at the carrier 120, the caliper housing 130 is movably installed at the carrier 120. The caliper housing 130 is provided with a cylinder 132 in which the piston 131 configured to pressurize the inner pad plate 110 is installed to be movable forward and backward at a rear portion of the caliper housing 130, and a pair of fingers 133 formed to bend downward to pressurize the outer pad plate 110 at a front portion of the caliper housing 130. The finger 133 and the cylinder 132 are integrally formed.

The piston 131 is provided in a cylindrical form having a concave cup-shaped interior, and is slidably inserted into the cylinder 132. When a braking hydraulic pressure is applied to the cylinder 132, the piston 131 is moved forward to pressurize the inner pad plate 110 toward the disc D, and the caliper housing 130 is moved in a direction opposite to the forward movement of the piston 131 by a reaction force such that the finger 133 pressurizes the outer pad plate 110 toward the disc D. Consequently, as the pair of pad plates 110 squeeze the disc D, a braking force is generated.

The elastic member 140 is installed at the caliper brake 100 having the above-described configuration to prevent vertical vibration of the caliper housing 130 and the carrier 120 when the vehicle is traveling, or braking is performed. The elastic member 140 is installed at the caliper housing 130 to elastically support a lower end portion of each side of the carrier 120, thereby allowing the carrier 120 and the caliper housing 130 to be in close contact with each other in a vertical direction to serve to prevent vibration thereof. More specifically, the elastic member 140 may be configured with a pin (wire) spring formed by bending a plurality of times. That is, the elastic member 140 is provided with an elastic supporter 144 having both distal ends mounted on the finger 133 of the caliper housing 130 and configured to bend at the mounted portion, and configured to elastically support the lower end portion of each side of the carrier 120. The elastic supporter 144 is installed to elastically support a lower side at which the slide recess 122 is formed, that is, the lower end portion of each side of the carrier 120.

The lower end portion of each side of the carrier 120, at which the elastic supporter 144 is positioned, is formed to be inclined. This resolves a problem in that a lower end portion of a conventional carrier is provided as a horizontal plane and thus an elastic member is difficult to install. More specifically, an inclined surface 124 of the lower end portion of each side of the carrier 120 is formed in a direction in which the caliper housing 130 slides. That is, the inclined surface 124 is formed and thus a distance from a line horizontally extending from the lower end portion is increased toward the finger 133. Consequently, a position P of an initial entry portion of the carrier 120, at which the elastic member 140 is installed, has a clearance height h in comparison with the related art, thereby facilitating the installation.

Further, although not shown in the drawing, a flat portion (a reference numeral is not assigned) may be additionally formed at a starting point and an end point of the above-described linearly inclined surface 124.

Figure 4:
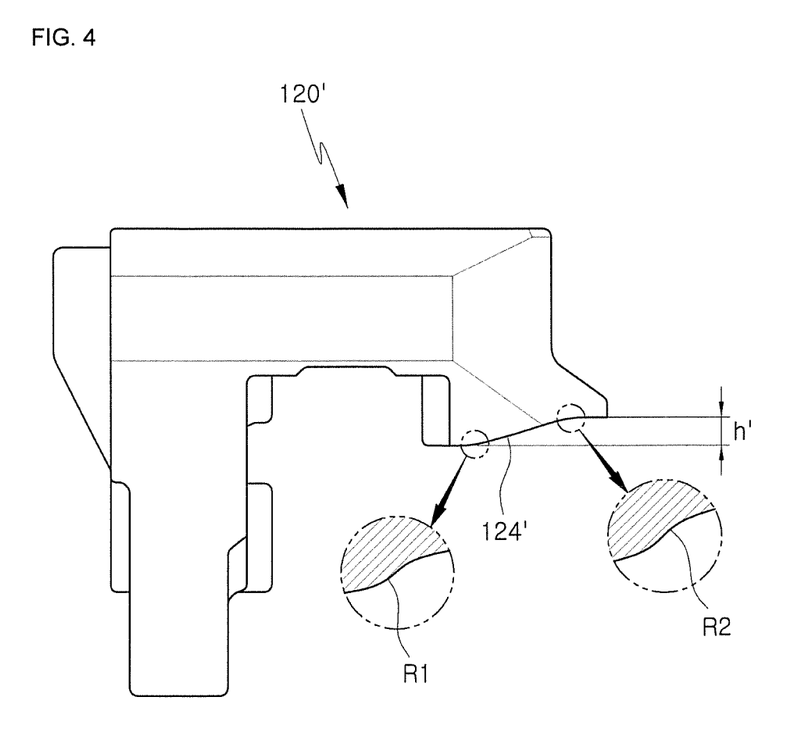
FIG. 4 is a lateral view illustrating another embodiment of a carrier provided in the caliper brake according to one embodiment of the present disclosure.

Meanwhile, although the inclined surface 124 of the lower end portion of each side of the carrier 120 according to the first embodiment of the present disclosure has been illustrated and described as being formed in a straight line, the present disclosure is not limited thereto, and the inclined surface 124 may be formed to be curved at least twice. For example, a carrier 120' according to a second embodiment of the present disclosure is illustrated in FIG. 4. As shown in the drawing, an inclined surface 124' formed at a lower end portion of each side of the carrier 120' is formed to include two inclined portions R1 and R2 having a curved line shape in a direction in which the caliper housing (See, 130 in FIG. 1) slides, and a flat portion (a reference numeral is not assigned) positioned at a starting point and an end point of each of the inclined portions R1 and R2. That is, the inclined surface 124' is formed such that a slope is varied by the curved inclined portions R1 and R2. At this point, when the elastic member 140 in FIG. 1 is moved in a state of being in contact with the inclined surface 124', since the inclined portions R1 and R2 are provided in a curved line shape, the elastic member 140 can be prevented from being moved forward and backward and can be smoothly moved.

Further, when the caliper housing (See, 130 in FIG. 1) is moved, detachment of the elastic member (140 in FIG. 1) can be prevented by the flat portion (a reference numeral is not assigned).

When the elastic member 140 is installed at the carrier 120' according to the present embodiment, a position of an initial entry portion of the carrier 120', at which the elastic member 140 is installed, has a clearance height h' in comparison with the related art such that the elastic member 140 is easily installed.

Next, a state in which an elastic force is varied when the elastic member 140 is installed along the inclined surfaces 124 and 124' will be described with reference to FIG. 6.

Figure 6:
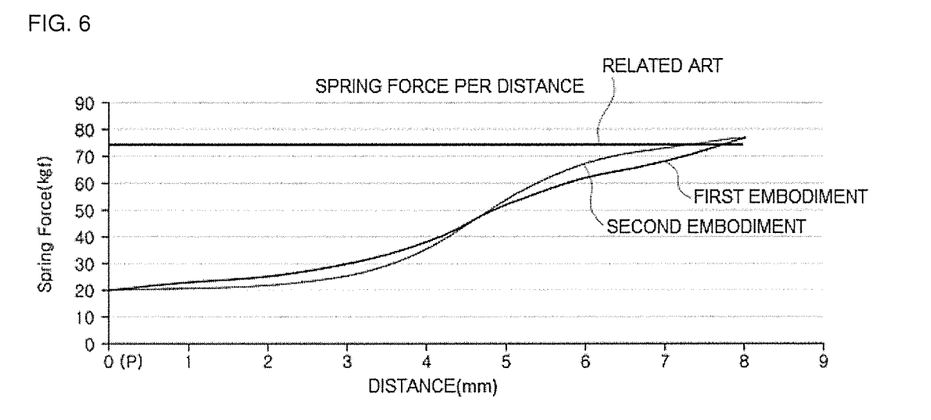
FIG. 6 is a graph illustrating a state in which an elastic force is varied according to a distance when the elastic member is assembled to the carrier shown in FIGS. 3 and 4.

As shown in FIG. 6, according to the related art, when an elastic member is installed at a carrier, the elastic member should be elastically deformed from the beginning so as to provide an elastic force to allow the caliper housing and the carrier to be in close contact with each other and then installed. Therefore, according to the related art, the elastic member should be installed after being elastically deformed to generate an elastic force of about 75 kgf. On the other hand, in the carriers 120 and 120' according to the first and second embodiments of the present disclosure, the inclined surfaces 124 and 124' are formed at the initial positions P at which the elastic member 140 is formed at the carriers 120 and 120' and thus the clearance heights h and h' are formed in comparison with the related art such that a rate in which the elastic force is applied to the elastic member 140 is significantly reduced in comparison with the related art. That is, according to the present disclosure, the elastic member 140 can be installed after being elastically deformed to generate an elastic force of about 20 kgf. Consequently, the elastic member 140 can be easily installed at the carrier 120.

Further, when the elastic supporter 144 of the elastic member 140 is installed by being gradually moved toward the carrier 120 or 120' along the inclined surface 124 or 124', the elastic force is increased according to the movement distance, and the elastic force of the elastic member 140 at a time when coupling is finally completed is equal to that of the related art, so that the elastic member 140 can smoothly perform a function of preventing vertical vibration between the caliper housing 130 and the carrier 120 or 120'.

Figure 5:
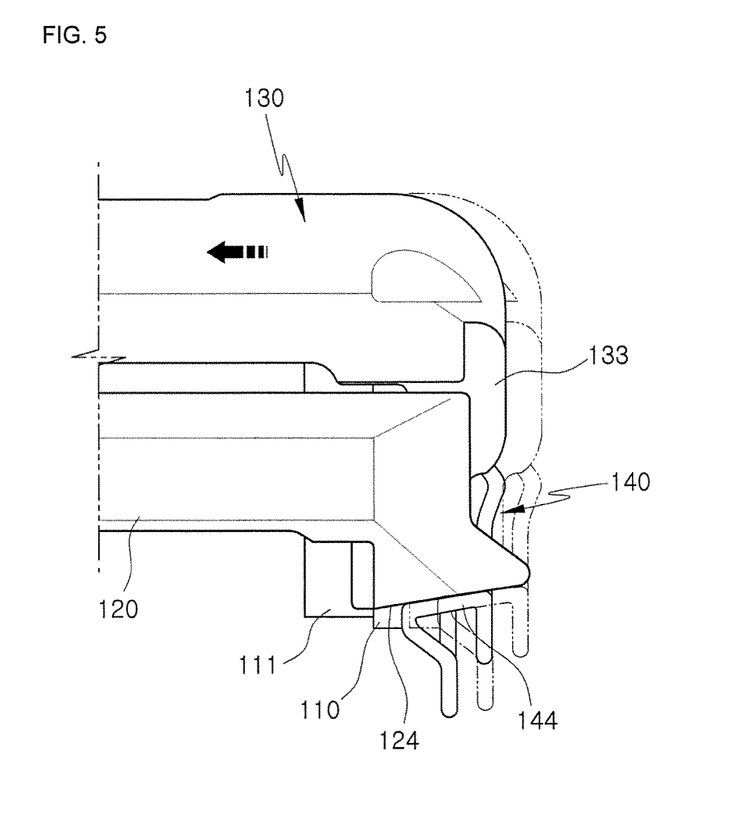
FIG. 5 is a diagram illustrating a state in which an elastic member is moved along an inclined surface of the carrier according to an operation of the caliper brake according to one embodiment of the present disclosure.

Hereinafter, a state in which the elastic member 140 is moved along the inclined surface 124 of the carrier 120 according to an operation of the caliper brake 100 will be described.

Referring to FIGS. 1 and 5, when a braking hydraulic pressure is applied to the cylinder 132 during a braking operation, the piston 131 is moved forward to pressurize the inner pad plate 110 toward the disc D. The caliper housing 130 is moved in a direction opposite to the movement direction of the piston 131 by a reaction force generated by the operation of the piston 131, and the finger 133 pressurizes the outer pad plate 110 toward the disc D. At this point, the elastic member 140 mounted on the finger 133 is moved together with the caliper housing 130. That is, the elastic supporter 144 of the elastic member 140 slides along the inclined surface 124 formed at the lower end portion of each side of the carrier 120 to prevent vibration of the caliper housing 130 and the carrier 120.

When the piston 131 and the caliper housing 130 return to their original positions after a braking operation is completed, since the elastic member 140 is moved along the inclined surface 124 of the carrier 120, the elastic member 140 easily returns to its original position.

As should be apparent from the above description, the caliper brake according to one embodiment of the present invention has an effect capable of preventing vertical vibration of a caliper housing and a carrier.

The caliper brake according to one embodiment of the present invention has an effect in which an elastic member configured to prevent vertical vibration of a caliper housing and a carrier can be easily installed at the caliper brake during assembly.

Further, since a lower end portion of a carrier in contact with an elastic member is formed to be inclined, when braking is released, the elastic member is configured to slide along an inclined surface of the carrier, and thus a caliper housing and the elastic member can smoothly return to their original positions such that there is an effect capable of preventing a drag phenomenon.

Although the present disclosure has been described above by way of specific embodiments and the accompanying drawings, the present disclosure is not limited thereto, and it should be understood that numerous other changes and modifications can be devised by those skilled in the art that will fall within the spirit and scope of this disclosure and within the full range of equivalents to which the appended claims are entitled.

What is claimed is:

1. A caliper brake comprising:
   a carrier having a pair of pad plates configured to be movable forward and backward and having a pair of arms;
   a caliper housing slidably installed at the carrier, and having a finger, which is bent downward and configured to pressurize each of the pair of pad plates; and
   an elastic member installed at the caliper housing and configured to elastically support a lower end portion of each of the pair of arms,
   wherein the caliper housing has a cylinder in which a piston configured to pressurize the pair of pad plates is arranged to be movable forward and backward in an axial direction of the piston at a rear portion of the caliper housing, and
   wherein the lower end portion of each of the pair of arms in contact with the elastic member has an inclined surface inclined upwardly away from the pair of pad plates in the axial direction of the piston.

2. The caliper brake of claim 1, wherein the lower end portion is inclined in a direction in which the caliper housing slides.

3. The caliper brake of claim 1, wherein the inclined surface of the lower end portion includes:
   a flat portion formed in a direction in which the caliper housing slides; and
   an inclined portion, and
   wherein the inclined portion has a curved line shape.

4. The caliper brake of claim 1, wherein the inclined surface of the lower end portion includes:
   a flat portion formed in a direction in which the caliper housing slides, and
   an inclined portion, and
   wherein the inclined portion has a straight line shape.

5. The caliper brake of claim 1, wherein the lower end portion of each of the pair of arms is arranged and configured such that a distance between a first end of the inclined surface and an axis of the piston is different from a distance between a second end of the inclined surface, which is opposite to the first end in the axial direction of the piston, and the axis of the piston.

6. The caliper brake of claim 4, wherein the inclined portion curvedly extends further from the straight line shape at a predetermined angle of greater than 0 degree.

7. The caliper brake of claim 1, wherein the inclined surface has an inclination angle increasing toward the finger.

* * * * *